(12) United States Patent
Herbst et al.

(10) Patent No.: US 11,453,248 B2
(45) Date of Patent: Sep. 27, 2022

(54) VEHICLE TIRE

(71) Applicant: Continental Reifen Deutschland GmbH, Hannover (DE)

(72) Inventors: Stephan Herbst, Langenhagen (DE); Stefan Rittweger, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 360 days.

(21) Appl. No.: 16/321,363

(22) PCT Filed: May 29, 2017

(86) PCT No.: PCT/EP2017/062820
§ 371 (c)(1),
(2) Date: Jan. 28, 2019

(87) PCT Pub. No.: WO2018/019449
PCT Pub. Date: Feb. 1, 2018

(65) Prior Publication Data
US 2019/0160884 A1    May 30, 2019

(30) Foreign Application Priority Data

Jul. 26, 2016   (DE) .................... 10 2016 213 702.6

(51) Int. Cl.
*B60C 11/13*        (2006.01)
*B60C 11/03*        (2006.01)
(52) U.S. Cl.
CPC ... *B60C 11/1353* (2013.01); *B60C 2011/0346* (2013.01); *B60C 2011/0358* (2013.01); *B60C 2011/1361* (2013.01); *B60C 2200/14* (2013.01)
(58) Field of Classification Search
CPC ......... B60C 11/1353; B60C 2011/1361; B60C 2011/0346; B60C 2200/14
See application file for complete search history.

(56) References Cited

U.S. PATENT DOCUMENTS

| 5,160,385 A | 11/1992 | Goto et al. |
| 7,703,491 B2 | 4/2010 | Oyama |
| 9,914,329 B2 | 3/2018 | Minoli et al. |

FOREIGN PATENT DOCUMENTS

| EP | 0 413 502 A1 | 2/1991 |
| EP | 1 810 849 A1 | 7/2007 |

(Continued)

OTHER PUBLICATIONS

International Search Report dated Aug. 9, 2017 of international application PCT/EP2017/062820 on which this application is based.

*Primary Examiner* — Timothy Kennedy
*Assistant Examiner* — Alexander A Wang
(74) *Attorney, Agent, or Firm* — Gregory Adams; David L. Cate

(57) ABSTRACT

An off-road tread profile with radially elevated profile elements, which are separated by circumferential channels, and with transversely running channels which open into circumferential channels, wherein the circumferential channels are formed, along their extent over the circumference of the tire, with a varied axial inclination, wherein, in the channel base of a circumferential channel, elevated stone deflectors are formed so as to be free from contact with the channel walls, which stone deflectors are formed from a cylindrical or frustoconical central body with maximum diameter D, the cylinder or cone axis of which is oriented in the radial direction, and from in each case one web-like body situated in front of the body in the extent direction of the circumferential channel and one web-like body situated behind, wherein the two web-like bodies are each formed so as to extend from the shell surface of the central body so as to be oriented parallel to the extent direction of the circumferential channel and point radially away from the central body and with a maximum width b, where (0.5 D)≥b≥1 mm, wherein central bodies are positioned in each case exclu- (Continued)

sively in circumferential extent regions of opening-in points of at least one transversely running channel into the circumferential channel.

5 Claims, 3 Drawing Sheets

(56) References Cited

FOREIGN PATENT DOCUMENTS

| | | |
|---|---|---|
| EP | 2 406 088 | 1/2012 |
| EP | 2 655 094 | 10/2013 |

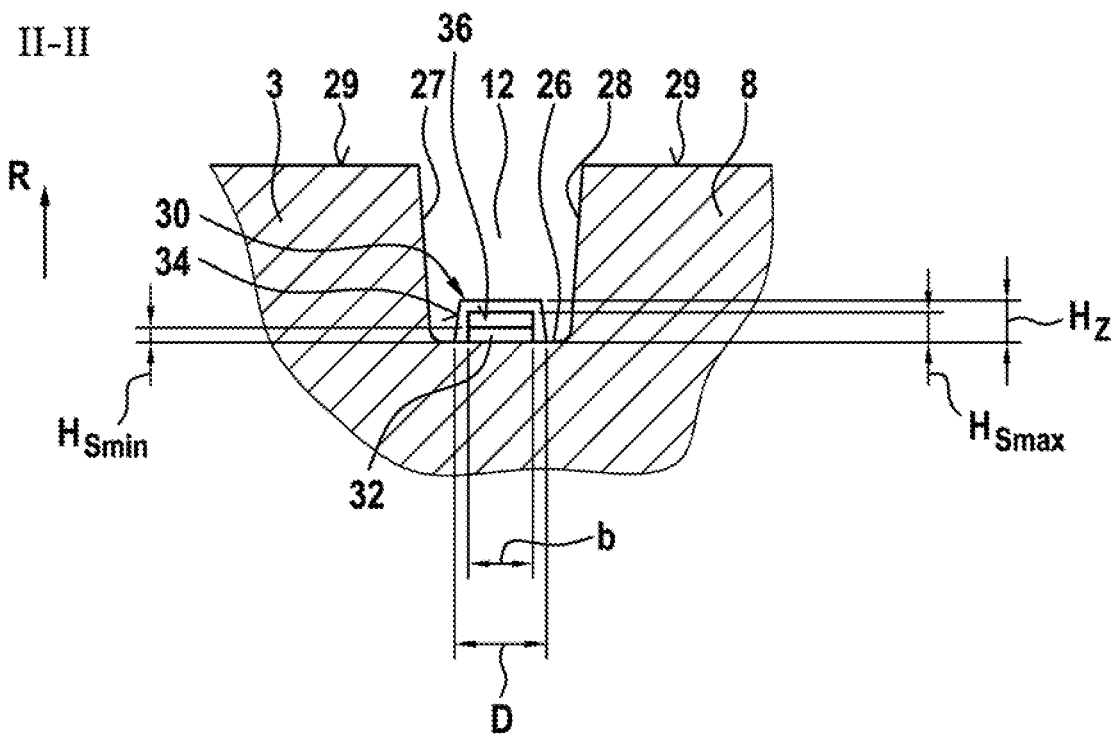
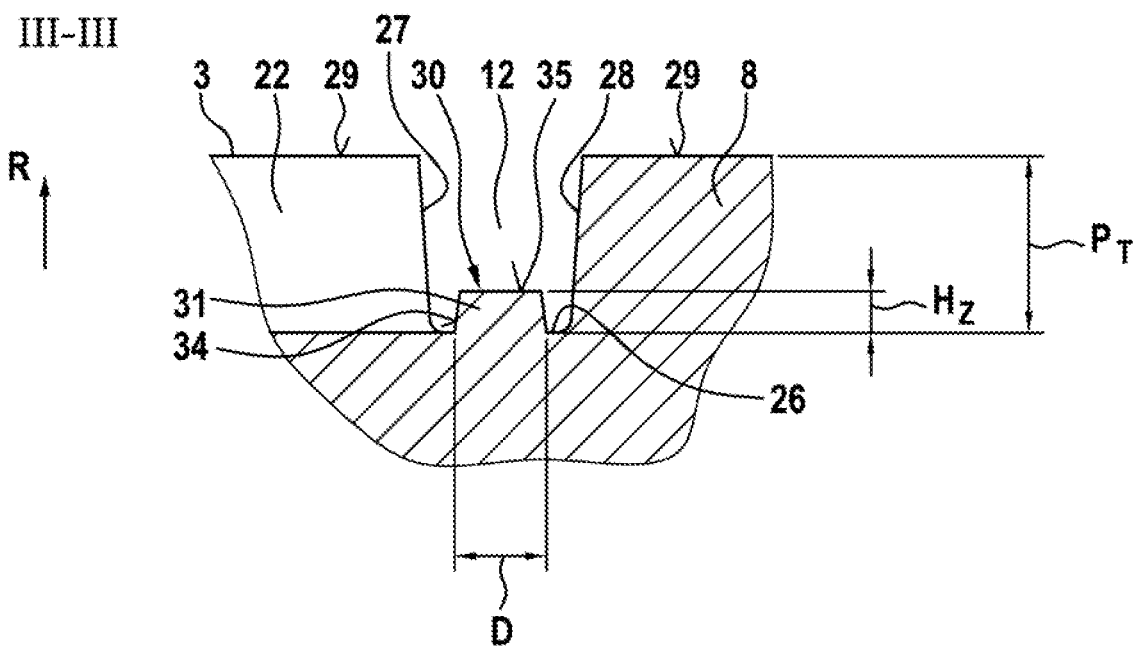

IV-IV

VEHICLE TIRE

CROSS REFERENCE TO RELATED APPLICATIONS

This application is the national stage of PCT/EP2017/062820, filed May 29, 2017, designating the United States and claiming priority from German patent application no. 10 2016 213 702.6, filed Jul. 26, 2016, the entire contents of which are incorporated herein by reference.

FIELD OF THE INVENTION

The invention relates to a vehicle tire having an off-road tread profile with radially elevated profile elements, which are separated by circumferential channels extending over the circumference of the vehicle tire, and with transversely running channels which open into circumferential channels, wherein the circumferential channels are delimited inward in a radial direction by a channel base and to both sides of the channel base in each case by a channel wall, and are formed, along their extent over the circumference of the tire, with a varied axial inclination.

BACKGROUND OF THE INVENTION

Pneumatic vehicle tires with off-road tread profiles are commonly formed with lug-like, radially elevated profile elements which are separated from one another by circumferential channels and transverse channels. Such profiles also have, in part, rib-like profile elements which extend over the circumference of the tire and which are separated from one another by circumferential channels, wherein, in the profile elements which extend in this way, there are formed additional transversely running channels which open into one of the two circumferential channels and end, with their other extent end pointing away from the circumferential channel, within the rib-like profile element. The circumferential channels of such profiles are, in terms of the course of their extent in the circumferential direction, formed with an axial inclination which is varied in short circumferential intervals, and to different degrees, in order to achieve good off-road characteristics. Owing to the use in the off-road environment, the risk of stones penetrating into the circumferential channels and into the channel base thereof, and in the case of penetration into the channel base, also as far as into the belt region, is particularly high. Therefore, in the case of these tread profiles, it is particularly desirable to provide protection against penetration of stones into the channel base. Here, in the case of off-road tires, owing to the alternating course of the circumferential channels with an axial inclination in one axial direction and then in the other axial direction, the flow of water through the circumferential channel, and thus the through-flow of water and the discharge of the water out of the profile, are already restricted. In the region of the opening-in points of the transverse channels into the circumferential channels, where the negative volume of the profile is particularly great, the risk of penetration of stones is particularly high. Owing to the intensely varied directional course of the circumferential channel between the opening-in positions of transverse channels which open in one behind the other, it is however the case in off-road profiles that the risk of the penetration of stones is relatively low in the extent region between the opening-in points.

Conventional known measures for preventing the penetration of stones into circumferential channels extend over the entire circumferential channel of a tire profile, and have a greater or lesser influence on the throughflow and thus the outflow of water from the circumferential channels, and thus for example have an adverse effect on the aquaplaning characteristics. Such known configurations of circumferential channels with stone ejectors formed in the channel base therefore additionally impede the outflow of water, which is already restricted specifically in off-road tires between the positions of opening-in points. To reliably permit satisfactory outflow of water, it would be necessary in the case of the known embodiments for the channels to be of particularly wide form, which is possible to a limited extent in the case of utility vehicle tires or even in the case of some normal passenger motor vehicle tires intended for road use. In this way, the influence on the flow can be limited, and nevertheless good protection against penetration of stones can be implemented.

In the case of off-road tires, however, such a configuration with wide, rectilinearly extending circumferential channels is possible only to a limited extent. Thus, specifically in the case of these tires, the formation of the conventional arrangements of stone ejectors lined up closely together over the circumference of circumferential ribs can be easily implemented only with considerable additional restrictions of the throughflow.

From U.S. Pat. No. 7,703,491, it is known, in the case of a utility vehicle tire with conventional block row profiles and circumferential channels extending rectilinearly over the circumference and rectilinearly extending, axially running transverse channels, for radially elevated stone ejectors to be formed, in each case so as to be arranged closely one behind the other, in the channel base of the rectilinearly extending circumferential and transverse channels, which stone ejectors are formed from a cylindrical central body and from multiple ramps extending so as to point radially away from the cylindrical body. The ramps are each formed so as to be approximately as wide as the diameter of the central body. In the region of opening-in points of transverse channels, a ramp is formed in each case in front of and behind the central body, which ramps extend in the direction extent of the rectilinearly extending circumferential direction, and furthermore, further ramps are formed which extend in the extent direction of the transverse channels. Such an embodiment of stone deflectors is possible in the case of utility vehicle tires with rectilinearly extending circumferential and transverse channels, wherein the circumferential channels are of very wide form, and offers protection there against penetration of stones. The embodiment of such stone deflectors with ramps which are approximately as wide as the diameter of the central body, in the case of which these stone deflectors of wide form which form flow obstructions are arranged close together both in circumferential channels and in transverse channels, and in the case of which, in the region of the opening-in point, additionally ramps formed transversely with respect to the circumferential channel, which ramps additionally greatly impede the flow through the circumferential channel, thus constitutes, in the lower region of the channel, a considerable obstruction to good throughflow. In the case of the utility vehicle tires formed in U.S. Pat. No. 7,703,491 with rectilinearly extending, wide circumferential channels and rectilinearly extending transverse channels, the adverse effect on the throughflow is limited.

The use of such an embodiment in the case of off-road tires with their conventional intense variations of the course of the inclination of the circumferential channels with narrow circumferential channels and also with transverse channels which are conventionally varied in terms of the course of their extent, in the case of which the flow through the course of the circumferential channel is in any case already impaired between the positions of the opening-in points of the transverse channels into the circumferential channel, would considerably further impair the throughflow of the water and impair the aquaplaning suitability of the tire.

SUMMARY OF THE INVENTION

It is an object of the invention, in the case of such vehicle tires with an off-road tread profile, to enable improved protection against penetration of stones, without significantly impairing the water throughflow.

The object can, for example, be achieved via an embodiment of a vehicle tire having an off-road tread profile with radially elevated profile elements, which are separated by circumferential channels extending over the circumference of the vehicle tire, and with transversely running channels which open into circumferential channels, wherein the circumferential channels are delimited inward in a radial direction by a channel base and to both sides of the channel base in each case by a channel wall, and are formed, along their extent over the circumference of the tire, with a varied axial inclination in which, in the channel base of at least one circumferential channel, radially elevated stone deflectors are formed so as to be free from contact with the channel walls, which stone deflectors are each formed from a cylindrical or frustoconical central body with maximum diameter D, the cylinder or cone axis of which is oriented substantially in the radial direction, and from in each case one web-like body situated in front of the central body in the extent direction of the circumferential channel and one web-like body situated behind the central body in the extent direction of the circumferential channel, wherein the two web-like bodies are each formed so as to extend from the shell surface of the central body so as to be oriented parallel to the extent direction of the circumferential channel and point radially away from the central body and with a maximum width b, where $(0.5\ D) \geq b \geq 1$ mm, and in which central bodies are positioned in each case exclusively in circumferential extent regions of opening-in points of at least one transversely running channel into the circumferential channel.

Via this embodiment, it is made possible for the stone deflectors to be positioned only in the region of the opening-in region of transverse channels into the circumferential channels, which in off-road tires is particularly critical specifically for the penetration of stones, and to thus be positioned in an effective manner. Here, the stone deflectors, with their webs of narrow form which are oriented only along the extent of the circumferential channel, are also of particularly streamlined form. In the region of the opening-in point of transverse channels into the circumferential channel, which is particularly critical for the penetration of stones and in which the flow of the water is in any case already impaired, at least by the circumferential channel and its course itself, owing to the large negative volume formed there the stone ejector positioned there makes it possible, via its streamlined, flow-guiding shape, to even realize a positive influence which guides the flow in the direction of the circumferential channel. In the between the positions of transverse channels which open in one behind the other in the circumferential direction, in which on the one hand the penetration of stones is particularly non-critical but on the other hand the flow-impeding influence of the course of the circumferential channel is particularly great, no additional stone ejectors that impair the flow in any way are formed. In this way, it is therefore possible even in the case of off-road tires to easily implement particularly effective protection against penetration of stones, without significantly impairing the outflow of the water from the profile and thus the aquaplaning suitability of the tire. Furthermore, this position also permits, in the molding of the tire during the course of production, additional stiffening specifically of the opening-in region of the transverse channel into the circumferential channel owing to the accumulation of the additional rubber material for the molding of the stone ejector in the channel base, whereby possible deformation of the belt during the course of the molding in the region of the opening-in point can be counteracted in an effective manner. In the finished tire, this results in an additional noise reduction of the tire.

According to an embodiment, b is configured such that 1 mm$\leq$b$\leq$3 mm. In this way, it is easily possible to implement adequate stability of the stone ejector with a small volume and good flow-around capability.

According to an embodiment, the two web-like bodies are each arranged substantially centrally in the circumferential channel. In this way, the stone ejection function can be easily implemented in optimized fashion.

According to an embodiment, the central body is formed with a height $H_Z$ measured in the radial direction R and the two webs are formed with a maximum height $H_S$, where $H_Z > H_S$, in particular $H_S \leq (H_Z - 0.5$ mm$)$, and wherein the web is formed with the maximum height $H_S$ in the intersection contour with the central body. In the central region of the large negative volume in the region of the opening-in point of the transverse channel into the circumferential channel, it is possible in this way for the central body to particularly effectively counteract the penetration of stones and to effect the ejection of stones, without significantly impairing the flow. The stone ejection can thus be further optimized in this way.

According to an embodiment, the central body is formed with a height $H_Z$, where 2 mm$\leq H_Z \leq (0.25\ P_T)$, where $P_T$ is the maximum profile depth in the circumferential channel. This makes it possible in a simple manner to implement a particularly effective stone ejection function with good aquaplaning characteristics.

According to an embodiment, the two webs are each formed with a maximum extent length L measured along their main extent direction proceeding from the central body, where 3 mm$\leq$L$\leq$10 mm. This permits a simple, variable integration of the stone ejectors in the region of the opening-in points into the circumferential channel with effective function.

BRIEF DESCRIPTION OF THE DRAWINGS

The invention will now be described with reference to the drawings wherein:

FIG. 2 shows a detail of the tread profile of FIG. 1 in a sectional illustration as per section II-II in FIG. 1, FIG. 3 shows a detail of the tread profile of FIG. 1 in a sectional illustration as per section in FIG. 1.

DESCRIPTION OF THE PREFERRED EMBODIMENTS OF THE INVENTION

Figure 1:
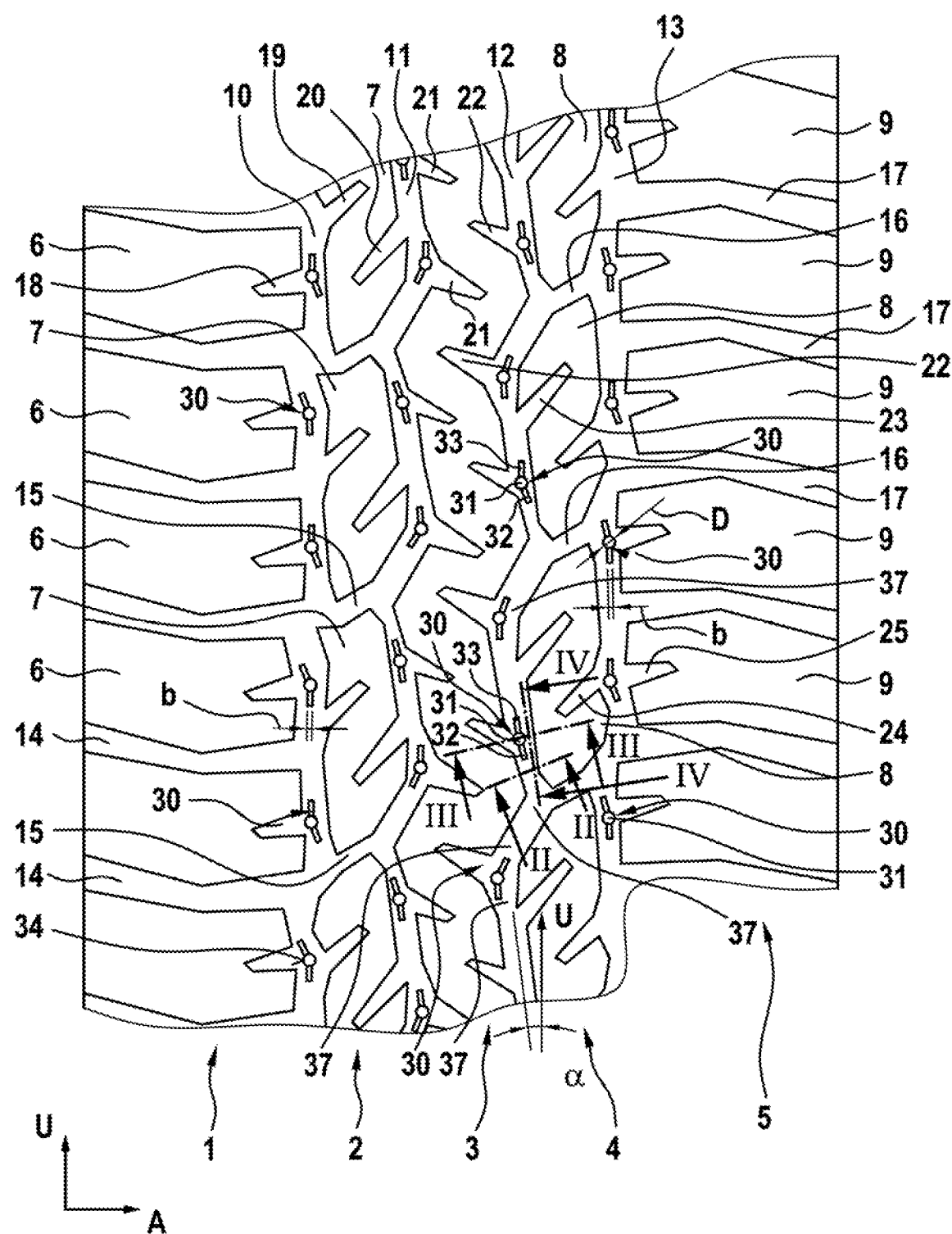
FIG. 1 shows a circumferential portion of a tread profile of an off-road pneumatic vehicle tire of a passenger motor vehicle in plan view.

FIGS. 1 to 4 show a tread profile of an off-road pneumatic vehicle tire of a passenger motor vehicle with five profile bands arranged adjacent to one another in an axial direction A, which profile bands are in each case separated from one another in the axial direction A of the pneumatic vehicle tire by circumferential channels. The two profile bands formed at the tire shoulders are in this case formed as profile block rows 1 and 5. In the axial direction A between the two profile block rows 1 and 5, there are formed two profile bands likewise as block rows 2 and 4, and a central profile band as a circumferential rib 3 formed between the two block rows 2 and 4. The profile block row 1 is formed so as to be axially spaced apart in the axial direction A from the profile block row 2 axially adjacent thereto by a circumferential channel 10. The profile block row 2 is formed so as to be spaced apart in the axial direction A from the circumferential rib 3 axially adjacent thereto by a circumferential channel 11. The circumferential rib 3 is formed so as to be spaced apart in the axial direction A from the profile block row 4 axially adjacent thereto by a circumferential channel 12. The profile block row 4 is formed so as to be axially spaced apart from the profile block row 5 by a circumferential channel 13.

The profile block row 1 is formed from profile block elements 6 which are arranged one behind the other in a circumferential direction U of the pneumatic vehicle tire and which are spaced apart from one another in the circumferential direction U in each case by transverse channels 14. The profile block row 5 is formed from profile block elements 9 which are arranged one behind the other in a circumferential direction U of the pneumatic vehicle tire and which are spaced apart from one another in the circumferential direction U in each case by transverse channels 17. The transverse channels 14 extend in the axial direction A through the profile block row 1 and open into the circumferential channel 10. The transverse channels 17 extend in the axial direction A through the profile block row 5 and open into the circumferential channel 13.

The profile block row 2 is formed from profile block elements 7 which are arranged one behind the other over the circumference of the pneumatic vehicle tire in the circumferential direction U and which are spaced apart from one another by transverse channels 15. The profile block row 4 is formed from profile block elements 8 which are arranged one behind the other over the circumference of the pneumatic vehicle tire in the circumferential direction U and which are spaced apart from one another in each case by transverse channels 16. The transverse channels 15 extend in the axial direction A through the entire profile block row 2 and open, in one axial extent direction, into the circumferential channel 10 and, in the other axial extent direction, into the circumferential channel 11. The transverse channels 16 extend in the axial direction A through the entire profile block row 4 and open, in one axial extent direction, into the circumferential channel 12 and, in the other axial extent direction, into the circumferential channel 13.

In the profile block elements 6, there is formed in each case one additional transverse channel 18 which extends, in the axial extent direction pointing away from the circumferential channel 10, from the circumferential channel 10 into the profile block elements 6, and ends there. In the profile block elements 9, there is formed in each case one additional transverse channel 25 which extends, in the axial extent direction pointing away from the circumferential channel 13, from the circumferential channel 13 into the profile block elements 9, and ends there.

In the profile block elements 7, there is formed in each case one additional transverse channel 19 which extends in the axial direction toward the central circumferential rib 3, from the circumferential channel 10 into the profile block elements 7, and ends there at a distance from the circumferential channel 11. Furthermore, in each profile block element 7, in each case one further transverse channel 20 is formed so as to be offset in the circumferential direction with respect to the transverse channel 19, which further transverse channel extends, in the axial extent direction A toward the profile block row 1, from the circumferential channel 11 into the profile block element 7, and ends there at a distance from the circumferential channel 10. Likewise, in each profile block element 8, there is formed in each case one additional transverse channel 24 which extends, in the axial direction toward the central circumferential rib 3, from the circumferential channel 13 into the profile block elements 8, and ends there at a distance from the circumferential channel 12. Furthermore, in each profile block element 8, in each case one further transverse channel 23 is formed so as to be offset in the circumferential direction with respect to the transverse channel 24, which further transverse channel extends, in the axial extent direction A toward the profile block row 5, from the circumferential channel 12 into the profile block element 8, and ends there at a distance from the circumferential channel 13.

Likewise, in the circumferential rib 3, additional transverse channels 22 are formed so as to be distributed over the circumference of the tire, which additional transverse channels extend, in the axial extent direction A toward the profile block row 1, from the circumferential channel 12 into the circumferential rib 3, and end there at a distance from the circumferential channel 11. Likewise, in each case between two transverse channels 22 arranged one behind the other in the circumferential direction U, an additional transverse channel 21 is formed in the circumferential rib 3, which additional transverse channels extend, in the axial extent direction A toward the profile block row 5, from the circumferential channel 11 into the circumferential rib 3, and end there at a distance from the circumferential channel 12.

The transverse channels 14 and 17 are in each case formed, along their axial extent, with at least one bend in the course of their extent. The transverse channels 15 and 16 are each formed as oblique channels running obliquely so as to enclose an angle of between 0° and 60° with the axial direction A. The transverse channels 20 and 19 are formed with an axial inclination in the same direction as that of the transverse channels 15. The transverse channels 23 and 24 are oriented with an axial inclination direction in the same direction as that of the transverse channels 17. The transverse channels 22 and 21 are likewise oriented so as to run obliquely with the same axial inclination direction.

The circumferential channels 10, 11, 12 and 13 are each formed, along their extent in the circumferential direction U, from a multiplicity of rectilinearly extending, relatively short extent portions arranged one behind the other, which extent portions are in each case connected to one another by a bend 37, such that the circumferential channels 10, 11, 12, 13, along their extent in the circumferential direction U, are formed so as to be oriented with an also along the extent of the profile block elements 7 or 8 adjacent thereto in each case with a repeatedly alternating angle of inclination a with respect to the circumferential direction U. Taking the example of the circumferential channel 12 in FIG. 1, only some of the bends 37 formed there have been denoted by the reference designation 37. It can be seen here that, along the extent of the circumferential channel 12—like the circumferential channels 10, 11 and 13—in the circumferential direction U, the angle of inclination a changes several times not only with regard to its magnitude—with a magnitude that varies in part to a very great degree—but also in terms of its inclination direction. Via the multiply bent course of the circumferential channels 10 and 11 or 12 and 13 respectively, and of the transverse channels 15, 19 and 20 or 16, 23 and 24 respectively, which delimit them, the profile block elements 7 and 8 are profile block elements formed in the manner of coarse lugs, with an S-shaped profile with a multiplicity of edges and corners. Likewise, via the course of the circumferential channels 11 and 12 and via the transverse channels 21 and 22, the circumferential rib 3 is formed as a coarsely structured, zigzag-shaped, intensely contorted circumferential rib with a multiplicity of edges and corners.

The circumferential channels 10, 11, 12 and 13 are delimited inwardly in the radial direction R in each case by a channel base 26 and, to both sides of the channel base 26, in each case by a channel wall 27 or 28. The channel wall 27 is in each case the channel wall that delimits in the axial direction A toward the profile block row 1, and the channel wall 28 is the channel wall that delimits in the axial direction A toward the profile block row 5. Likewise, the transverse channels 14, 15, 16, 17, 19, 20, 21, 22, 23 and 24 of the profile are in each case delimited inwardly in the radial direction R by a channel base and, to both sides of the channel base, by a channel wall.

The profile block elements 6, 7, 8, 9 and the circumferential rib 3 are delimited outwardly in the radial direction R in each case by a radially outer surface 29 which forms the ground contact surface of the tire.

In the circumferential channels 10, 11, 12 and 13, radially elevated stone ejectors 30 are formed in each case one behind the other in the channel base 26 in a manner distributed over the circumference of the tire. The stone ejectors 30 are formed in each case from a central body 31 and from two webs 32 and 33. Here, each stone ejector 30 is positioned with its central body 31 at a circumferential position of the respective circumferential channel in which, into the respective circumferential channel, one of the transverse channels that ends in the profile band delimited by the circumferential channel opens into the circumferential channel.

Figure 4:
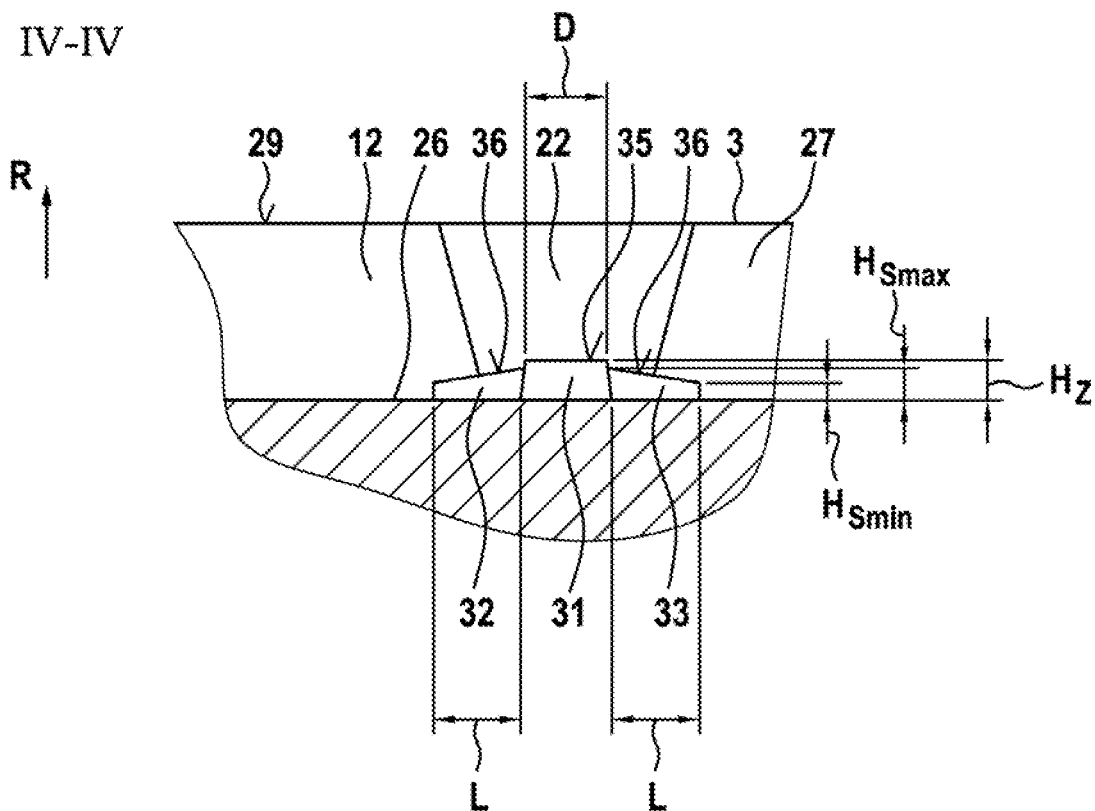
FIG. 4 shows a detail of the tread profile of FIG. 1 in a sectional illustration as per section IV-IV in FIG. 1.

By way of example, this is discussed in more detail below on the basis of the stone ejector 30 of the circumferential channel 12 and illustrated in FIGS. 2 to 4. In the circumferential channel 12, the stone ejectors 30 are positioned in each case at a circumferential position of the circumferential channel 12 into which a transverse channel 22 of the circumferential rib 3 that delimits the circumferential channel 12 opens into the circumferential channel 12. As illustrated in FIGS. 1 to 4, the central body 31 is a cylindrical or frustoconical central body 31, the cylinder axis or cone axis of which is oriented in the radial direction R of the tire, and the lateral surface 34 of which has a maximum diameter D. As can be seen in FIGS. 2 to 4, the figures illustrate an example of a central body 31 of frustoconical form, in which the cone opening angle is selected to be $\gamma=5°$, and in which the cone tip is arranged at a radial position outside the channel base 26. In this embodiment, the maximum diameter D of the central body 31 is formed in the channel base 26. The frustoconical central body 31 is delimited at a height $H_Z$ radially above the channel base 26 by a planar face surface 35.

Thus, the central body 31 extends in a radial direction R as far as a height $H_Z$ above the channel base 26, and ends there. As illustrated in FIG. 1, a web 32 is formed in front of the central body 31 in the circumferential direction U, and a web 33 is formed behind the central body 31 in the circumferential direction U. The webs 32 and 33 extend in each case rectilinearly, with a constant width b, measured in each case perpendicular to their extent direction, along their entire extent. Here, the webs 32 and 33 extend radially outward, with an extent direction of the central body 30 which is radial with respect to the cylinder axis or cone axis, from the lateral surface 34 of the central body 31 over a maximum extent length L, where 3 mm≤L≤10 mm, and end there.

As can be seen in FIG. 2 and in FIG. 4, the webs 32 and 33 are delimited outwardly in the radial direction R by a planar top surface 36. Here, the webs 32 and 33 are formed, in the radial direction R of the pneumatic vehicle tire, with a maximum height, measured from the channel base 26, at the position of their area of intersection with the lateral surface 34 of the central body 31. The height $H_S$ decreases continuously from the value $H_{Smax}$ of its maximum height at the lateral surface 34 along the extent of the respective web 32 and 33 over the extent length L of the web 23 or 33, and reaches its minimum value of $H_{Smin}$ at the extent end of the web 23 or 33 pointing away from the central body 31. Here, $H_{Smax} < H_Z$ and $H_{Smin}$ (≤$H_Z$−0.5 mm).

The height $H_Z$ is configured such that 2 mm≤$H_Z$≤(0.25 $P_T$), where $P_T$ is the profile depth measured in the circumferential channel 12 between the radially outer surface 29 of the circumferential rib 3 and profile block elements 8 that delimit the circumferential channel 12, on the one hand, and the channel base 26 of the circumferential channel 12. In the case of off-road tires, the profile depth $P_T$ is in this case configured such that 8 mm≤$P_T$≤12 mm.

In the embodiment illustrated, the length L is configured such that 5 mm≤L≤6 mm, for example L=5 mm.

In the embodiment illustrated, the measurements are configured such that $H_Z$=4 mm, $H_{Smax}$=1.9 mm and $H_{Smin}$=0.5 mm.

The web width web width b, which is formed so as to be constant along the extent of the webs 32 and 33 in their main extent direction and in the radial extent direction of the tire, is configured such that (0.5 D)≥b≥1 mm, where b≤3 mm. For example, D=4 mm and b=1.5 mm.

As can be seen in FIG. 1, it is the case here that the web 32 situated in front of the central body 31 in the circumferential direction U of the tire is in each case oriented with its main direction of extent substantially adapted to the course of the extent of the circumferential channel 12 in the extent region of the web 32, and the web 33 situated behind the central body 31 in the circumferential direction is oriented so as to be adapted to the course of the extent of the circumferential channel 12 in the extent region of the web 33. In this way, correspondingly to the in part with intensely kinked course of the circumferential channel 12, the course of the extent of the web 32 and the course of the extent of the web 33 are also, in the case of some stone ejectors 30, formed so as to deviate considerably from one another, wherein the stone ejector 30 is formed with a kink in the position of the cylinder axis or cone axis of the central body 31.

Here, the central body 31 of a stone ejector 30 is positioned substantially centrally with respect to the circumferential channel 12 in the axial direction A of the pneumatic vehicle tire. The stone ejector 30 forms, with its kinked course and the narrow webs 32 and 33, a streamlined guide surface for the flow in the region of the channel base.

As can be seen in FIG. 1, in the circumferential channel 12, the stone ejectors 30 are formed in each case at the opening-in position of the transverse channels 22 into the circumferential channel 12. Analogously, a stone ejector 30 is positioned in the circumferential channel 11 in each case at the circumferential position of the opening-in point of a transverse channel 21 into the circumferential channel 11. Analogously, a stone ejector 30 is positioned in the circumferential channel 10 in each case at the circumferential position of the opening-in point of a transverse channel 18 into the circumferential channel 10, and in the circumferential channel 13 in each case at the circumferential position of the opening-in point of a transverse channel 25 into the circumferential channel 13.

Even though FIGS. 2 to 4 illustrate the central body 31 as a frustoconical central body, it is the case in another embodiment (not illustrated), as already described above, that the central body 31 is formed as a cylindrical central body 31, wherein the maximum diameter D then corresponds to the cylinder diameter.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (Part of the Description)
1 Block row
2 Block row
3 Circumferential rib
4 Block row
5 Block row
6 Block element
7 Block element
8 Block element
9 Block element
10 Circumferential channel
11 Circumferential channel
12 Circumferential channel
13 Circumferential channel
14 Transverse channel
15 Transverse channel
16 Transverse channel
17 Transverse channel
18 Transverse channel
19 Transverse channel
20 Transverse channel
21 Transverse channel
22 Transverse channel
23 Transverse channel
24 Transverse channel
25 Transverse channel
26 Channel base
27 Channel wall
28 Channel wall
29 Radially outer surface
30 Stone ejector
31 Central body
32 Web
33 Web
34 Lateral surface
35 Face surface
36 Top surface
37 Bend

The invention claimed is:

1. A vehicle tire comprising:
an off-road tread profile having radially elevated profile elements;
the vehicle tire defining a tire circumference;
said elevated profile elements being separated by circumferential channels extending over said tire circumference;
said off-road tread profile further having transversely running channels which open into said circumferential channels;
said circumferential channels being delimited inwardly in a radial direction by a channel base and to both sides of said channel base in each case by a channel wall;
said circumferential channels being formed, along their extent over the tire circumference, with a varied axial inclination;
a plurality of radially elevated stone deflectors formed in said channel base of at least one of said circumferential channels so as to be free from contact with the channel walls;
said stone deflectors being each formed from one cylindrical central body with maximum diameter D; wherein said cylindrical central body defines a cylinder or a cone axis which is oriented in the radial direction, and a first web-like body disposed in front of said central body in an extent direction of the corresponding one of said circumferential channels and a second web-like body disposed behind said central body in the extent direction of the corresponding one of said circumferential channels;
said central bodies each having a shell surface;
said first web-like bodies and said second web-like bodies each being formed so as to extend from said shell surface of the corresponding one of said central bodies so as to be oriented parallel to the extent direction of the corresponding one of said circumferential channels and to point radially away from said central body;
said first web-like body and said second web-like body each have a maximum width b, where $(0.5\ D) \geq b \geq 1$ mm; and,
said central bodies each being positioned exclusively in circumferential extent regions of opening-in points of said transversely running channels into the corresponding one of said circumferential channels; and
said central bodies are formed with a height HZ measured in a radial direction R and said first web-like bodies and said second web-like bodies are formed with a maximum height HS, wherein $HZ > HS$ where $HS \leq (HZ - 0.5\ \text{mm})$; and, said first web-like bodies and said second web-like bodies are each formed with the maximum height HS in an intersection contour with the corresponding one of said central bodies;
said first web-like bodies and said second web-like bodies are each formed with the maximum height HS in an intersection contour with the corresponding one of said central bodies.

2. The vehicle tire of claim 1, wherein $1\ \text{mm} \leq b \leq 3\ \text{mm}$.

3. The vehicle tire of claim 1, wherein said first web-like body and said second web-like body are each arranged centrally in the corresponding one of said circumferential channels.

4. The vehicle tire of claim 1, wherein said central bodies are formed with a height HZ, where $2\ \text{mm} \leq HZ \leq (0.25\ PT)$, where PT is a maximum profile depth in the corresponding one of said circumferential channels.

5. The vehicle tire of claim 1, wherein said first web-like bodies and said second web-like bodies are each formed with a maximum extent length L measured along their main extent direction proceeding from the corresponding one of said central bodies, where 3 mm≤L≤10 mm.

* * * * *